United States Patent
Cabeza

(10) Patent No.: US 10,258,068 B2
(45) Date of Patent: Apr. 16, 2019

(54) ALMOND PÂTÉ

(71) Applicant: Maria de las Nieves Cabeza, Carpinteria, CA (US)

(72) Inventor: Maria de las Nieves Cabeza, Carpinteria, CA (US)

( * ) Notice: Subject to any disclaimer, the term of this patent is extended or adjusted under 35 U.S.C. 154(b) by 0 days.

(21) Appl. No.: 14/955,351

(22) Filed: Dec. 1, 2015

(65) Prior Publication Data

US 2016/0095344 A1    Apr. 7, 2016

Related U.S. Application Data

(63) Continuation-in-part of application No. 14/339,456, filed on Oct. 6, 2014, now abandoned.

(51) Int. Cl.
| | | |
|---|---|---|
| A23L 1/00 | (2006.01) | |
| A23L 19/00 | (2016.01) | |
| A23L 25/00 | (2016.01) | |
| A23L 25/10 | (2016.01) | |

(52) U.S. Cl.
CPC .............. *A23L 19/09* (2016.08); *A23L 25/10* (2016.08); *A23L 25/30* (2016.08); *A23V 2002/00* (2013.01)

(58) Field of Classification Search
CPC ................................ A23L 27/26; A23C 20/00
USPC ................................ 426/574, 629, 512, 518
See application file for complete search history.

(56) References Cited

U.S. PATENT DOCUMENTS

| | | | | |
|---|---|---|---|---|
| 5,693,350 A | * | 12/1997 | Fernandez | A23B 4/22 426/58 |
| 5,718,932 A | * | 2/1998 | Nakao | A23L 27/235 426/104 |
| 6,074,681 A | * | 6/2000 | Nakai | A23B 7/028 426/242 |
| 2011/0311704 A1 | * | 12/2011 | Barey | A23C 20/00 426/574 |
| 2015/0305390 A1 | * | 10/2015 | Vrljic | A23L 27/26 426/574 |

* cited by examiner

*Primary Examiner* — Nina Bhat

(57) ABSTRACT

Described is a process for creating almond pâté, a vegan spread. The ingredients include almonds, olives, one or more vinegars, water, oil, garlic, white pepper and black pepper. The almonds are initially soaked for approximately 24 hours at room temperature in low pH salt solution. The almonds are then combined and processed with other ingredients. The result is a healthy and appealing alternative substantially similar in consistency and satiety as a traditional liver pate.

10 Claims, 1 Drawing Sheet

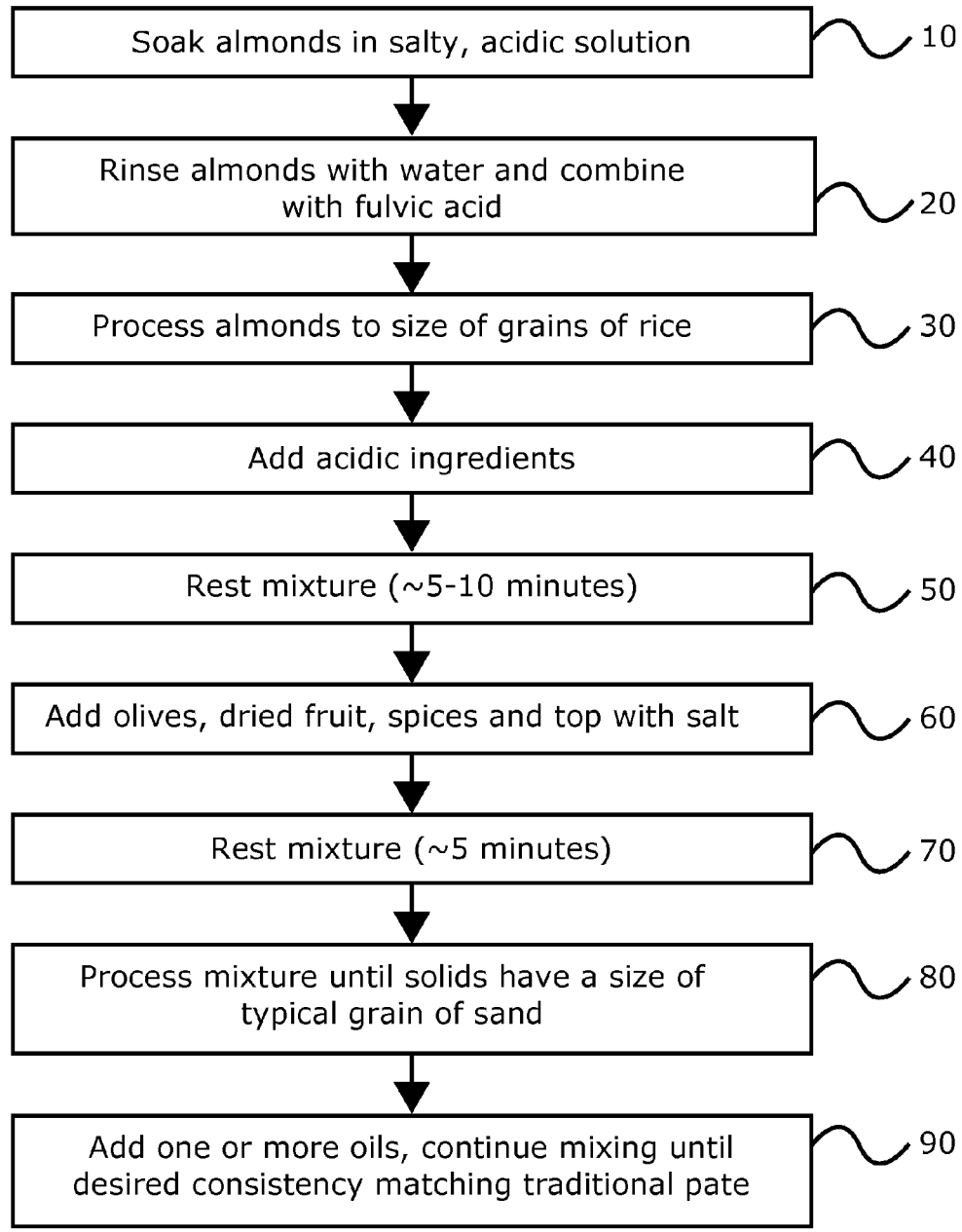

ALMOND PÂTÉ

This application claims the benefit and filing date of pending U.S. non-provisional patent application having Ser. No. 14/339,456 and filed on 6 Oct. 2014.

BACKGROUND

Field

The present invention relates generally to methods, and products prepared by such methods, for a pâté made from non-animal sources including nuts such as almonds, walnuts and hazelnuts.

Related Art

Butters, spreads, sauces, emulsions, and a myriad other types of food products have been made since the dawn of civilization. One particular need that has been addressed is preservation of food during off-season times. As refrigeration, bottling, canning, dehydration and other preservation techniques have improved, attention has turned to increasing the objective and subjective qualities of the products, and to reduce the impact on the planet and on the domestic animals used in the preparation of foodstuffs.

Traditional pâté (herein pate) is typically made from mechanically combining or mincing a cooked ground meat with fat and certain herbs and spices. It can be served hot or cold. Typical liver pate is a cultural favorite, an appetizer and snack enjoyed by people around the world including Argentinians. Because traditional pate contains meat, many people cannot or choose not to eat it even if they enjoy it. Various substitutes have been proposed, but obtaining a replacement that matches traditional pate in texture, spreadability, flavor and appearance has remained elusive. Accordingly, the present disclosure is directed toward overcoming many of the shortcomings of known techniques and recipes for pates.

SUMMARY

Embodiments and techniques described herein relate to the process of preparing an almond-based food product with a consistency, flavor and appearance of traditional pate. According to one implementation, almonds are soaked in a solution of water, citric acid and sea salt. The almonds are thereby softened and achieve a desired texture. The solution preferably has a pH not higher than 2.1. The almonds are drained and rinsed with water. Next, the almonds are ground or chopped, and combined with a dilute aqueous solution of fulvic acid. The fulvic acid enhances flavor and stabilizes the pH. Once the almonds are processed to the size of about a grain of rice, acidic ingredients are added. Preferably, a combination of a vinegar and lemon juice. The vinegar may be a single vinegar or a combination of several vinegars depending on taste and composition of the herbs used. According to one variation, the vinegar is a distilled white vinegar. According to another variation, the vinegar is a cider vinegar. According to yet another variation, the vinegar is a red wine vinegar. This step of adding acidic ingredients further acidifies the almonds. Lowering the pH extends the shelf life of the product. The mixture is allowed to rest between five and ten minutes.

Next, the almond pieces are combined with olives, dry grapes, sea salt and some spices such as white pepper and black pepper. This mixture is allowed to rest for approximately five minutes. The mixture is process until the pieces are the size of beach sand particles. Oils are slowly added during the processing until the consistency of the mixture resembles a traditional liver-based pate.

This summary is provided to introduce a selection of concepts in a simplified form that are further described below in the detailed description. This summary is not intended to identify key or essential features of the claimed subject matter, and thus is not intended to be used to limit the scope of the claimed subject matter.

BRIEF DESCRIPTION OF THE DRAWINGS

While the appended claims set forth the features of the disclosure with particularity, the disclosure, together with its objects and advantages, is more readily appreciated from the following detailed description, taken in conjunction with any accompanying drawings. Throughout, like numerals generally refer to like parts. Unless specifically indicated, the components and drawings are not shown to scale.

FIG. 1 illustrates a flowchart of steps for preparing a pate according to one implementation of the teachings provided herein.

DETAILED DESCRIPTION

Overview. The present disclosure solves many of the shortcomings of known methods of preparing a vegetarian version of a traditional pate. The product produced by following the process described herein captures the flavors, textures and gastronomical experience of traditional liver pate or spreads while simultaneously using healthy an vegan ingredients. The flavor profile of this product enables it to become a suitable meatless substitute for traditional pates in any traditional meal. For example, the almond pate described herein may be served on crackers and paired with wine. The result after consumption is a satisfying experience substantially similar to that of consuming a liver or animal-based pate. The following disclosure provides further details of preparation of such a product.

FIG. 1 illustrates a flowchart of steps for preparing a pate according to one implementation of the teachings provided herein. The amounts provided herein are to provide an example of proportions of ingredients with reference to one another; the amounts are not in any way a limitation.

With reference to FIG. 1, a first step 10 includes soaking a pound of almonds for 24 hours at room temperature or in a refrigerator in a solution made from one liter of water, 40 grams of citric acid, and 30 grams of sea salt or a table salt. This step 10 allows the almonds to swell and soften to achieve a desired texture. When submerged in an acid solution, almonds acidify which extends their shelf life. The solution should be at or below a pH of 2.1; that is, the pH should not be higher than 2.1.

The next step 20 includes draining the almonds and rinsing the almonds, preferably with filtered water, to get rid of impurities and excess solution.

After that, the second part of this step includes combining the almonds with a solution of four ounces of distilled water and twelve drops of fulvic acid. The fulvic acid enhances flavor and stabilizes pH. As used herein, fulvic acid is at least a highly water soluble organic phenolic compound. Fulvic acid also may be made or extracted from humus. While mentioned in the singular since this substance is commercially available under this name, fulvic acid includes a variety of chemical species. At least one variant of fulvic acid chelates elemental mineral nutrients. Fulvic acids may be isolated from humic substances which are formed by microbial degradation of dead plant matter such as lignin which is a class of compounds that are cross-linked phenol polymers. Humic substances are resistant to biodegradation. The properties and structure of a humic-laden sample depend on the water and soil source and the specific conditions of extraction. The average properties of humic substances from different sources are remarkably similar. Humic substances can be divided into the following three main fractions: humic acids, fulvic acids and humin. The humic and fulvic acids can be extracted as a colloidal sol from soil and other solid phase sources into a strongly basic aqueous solution of sodium hydroxide or potassium hydroxide. Humic acids are precipitated out of solution by adjusting the pH to 1 with hydrochloric acid. The fulvic acids remain in solution. It is this solution which is added to the mixture. Humin remains insoluble and is not part of a commercially available fulvic acid ingredient. Fulvic acids are made up of various complex organic molecules that are generally soluble independent of pH and ionic strength.

Referring again to FIG. 1, in the next step 30, the almonds are ground or processed to about the size of grains of rice. Subsequently, the next step 40 includes adding one or more acidic ingredients. According to one variation, step 40 includes adding 9.0 ounces of vinegar and 0.6 ounces of lemon juice, preferably freshly squeezed juice from an actual lemon. These two acidic ingredients acidify the almonds. This step 40 lowers the pH of the almonds and extends the shelf life of the final product.

In the next step 50, the mixture is allowed to rest for 5-10 minutes, but preferably not longer than 10 minutes.

In the next step 60, other substantive ingredients are added to the almond mixture. In step 60, six ounces of olives are added along with 1.2 ounces of dry grapes (or dried grapes, raisins or other dried fruit), 0.2 ounces of white pepper, 0.2 ounces of black pepper, and top with 1.2 ounces sea salt or other table-quality salt. Prior to being added, dried fruit may be softened with the addition of water. These ingredients of step 60 may be mixed into the other ingredients by hand or by a mechanical or electric mixer.

In the next step 70, the resultant mixture is allowed to rest without being disturbed for at least five minutes.

In the next step 80, the mixture is processed until the mixture has the texture of sand—that is, until the pieces of almond and pieces of other solid ingredients are approximately the size of grains of sand.

In the last illustrated step, step 90, one or more oils are added slowly while processing the mixture until the mixture has a consistency that resembles real pate. The one or more oils may be selected from a variety of available food grade oils including almond oil, beech nut oil, canola oil, cashew oil, coconut oil, corn oil, cottonseed oil, hazel nut oil, manicotti oil, olive oil, palm oil, peanut oil, rapeseed oil, safflower oil, sesame oil, soybean oil, sunflower oil, and walnut oil.

According to another alternative recipe or variation, the following are the proportion of ingredients mixed according to the process outlined above:
  1 part almonds,
  between 1/3 and 1/2 part olives,
  between 1/5 and 1/4 part vinegar,
  between 1/5 and 1/4 part water,
  between 1/8 and 1/7 part oil,
  between 1/40 and 1/20 part garlic,
  between 1/100 and 1/90 part white pepper,
  between 1/100 and 1/90 part black pepper, and
  between 1/120 and 1/100 part powdered dry dates.

According to yet another alternative recipe or variation, a vegan pate is formed by performing the following steps. First, a pound of nuts such as almonds, walnuts or hazel nuts is soaked for 32 hours in a solution made from 0.8 L water, 40 grams citric acid and 30 grams of sea salt. Soaking allows the nuts to swell and soften to achieve a preferred texture. Submerging and soaking the nuts in such an acid solution extends the shelf life of the nuts, and the shelf life of the finish product. The solution can vary as long as the pH is not higher than 2.1. Also, the soaking time of 32 hours can be varied will depending on the type and size of the nuts used. The soak time of 32 hours is for almonds.

Next, the nuts are drained and rinsed with clean water, preferably with filtered water. Rinsing gets rid of impurities and unwanted particles. Next, the rinsed nuts are combined with dry fruit, salt, spices and acidic ingredients including a fulvic acid solution. The acidic ingredients include one or more vinegars, lemon juice and the fulvic acid solution. The fulvic acid solution is made from 4.0 ounces of distilled water and 25 drops of fulvic acid. The nuts and dry fruit are processed until the large nut and fruit pieces have the size of typical grains of sand. The spices include mustard and one or more dried pepper products such as black pepper or white pepper. This mixture is rested for ten minutes.

Next, olives are added to the processed mixture. One or more oils are also added. Olives and the one or more oils are added, and the mixture further mixed, until the consistency of the mixture matches traditional pate. The olives and oil are added slowly. According to a variation, one or more of the oils may be combined with a rosemary extract or infused by exposing the oil to rosemary leaves prior to adding the one or more oils to the mixture. Alternatively, rosemary oil can be used. The rosemary and/or oils provide stabilization and enhance the finished product.

Packing and Molding. According to a further implementation, for purposes of distribution, in a sterilized, four ounce, straight wall jar, the following are placed therein: about 1/8 of a teaspoon of dry herbs or spices depending on desired flavor, and about 1/2 of a teaspoon of olive oil. Then, using a funnel, two scoops of pate are placed in the jar. The net weight may be noted and additional pate is added until the net weight of the product meets the weight guidelines. The surface of the product may be evened out for aesthetic impression. Preferably, and additionally, on the top of the pate product is placed 1/8 of a teaspoon of herbs and 1/2 of a teaspoon of olive oil. The jar is covered with the lid and tightened.

For a perishable pate, the jars are placed in a vacuum sealer and then refrigerated in a refrigerator. For canned pate, the jars are steamed at 212 degrees F. for approximately 14 minutes. Next, the jars are removed from the steamer, and placed on a perforated rack. The jars are cooled. The jars are sealed using a fan for as long as two hours. This process improves smoothness, and makes the product remain solid for optimal presentation and gastronomic integrity.

Conclusion. In the previous description, for purposes of explanation, numerous specific details are set forth in order to provide an understanding of the invention. It will be apparent, however, to one skilled in the art that the invention can be practiced without these specific details. In other instances, structures, devices, systems and methods are shown only in block diagram form in order to avoid obscuring the invention.

Reference in this specification to "one embodiment", "an embodiment", or "implementation" means that a particular feature, structure, or characteristic described in connection with the embodiment or implementation is included in at least one embodiment or implementation of the invention.

Appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

It will be evident that the various modification and changes can be made to these embodiments without departing from the broader spirit of the description. In this technology, advancements are frequent and further advancements are not easily foreseen. The disclosed embodiments may be readily modifiable in arrangement and detail as facilitated by enabling technological advancements without departing from the principles of the present disclosure.

I claim:

1. A food product made from the process comprising:
    soaking whole almonds in a solution of water, citric acid and sea salt, and wherein the solution has a pH not higher than about 2.1;
    draining the almonds;
    rinsing the almonds with excess water;
    combining the almonds with an aqueous solution of fulvic acid;
    processing the almonds until the almonds and pieces thereof are approximately the size of grains of rice;
    adding an aqueous acidic solution;
    adding olives, dried fruit pieces and at least one of a white pepper, a black pepper, and a salt;
    processing the mixture until solid pieces are approximately the size of sand particles;
    continue processing and adding an oil until the mixture obtains a consistency substantially similar to a traditional pate.

2. The food product of claim 1, and wherein the aqueous acidic solution includes a vinegar.

3. The food product of claim 1, and wherein the aqueous acidic solution includes a lemon-based acid.

4. The food product of claim 1, and wherein after adding the aqueous acidic solution, the mixture is allowed to rest between five and ten minutes.

5. The food product of claim 1, and wherein after adding the aqueous acidic solution, the mixture is allowed to rest at least one minute.

6. The food product of claim 1, and wherein the dried fruit pieces are raisins.

7. The food product of claim 1, and wherein the dried fruit pieces are plums.

8. The food product of claim 1, and wherein the dried fruit pieces are dried peaches.

9. The food product of claim 1, and wherein the dried fruit pieces are dried apricots.

10. A method for processing almonds into a food product, the method comprising:
    soaking whole almonds in a solution of water, citric acid and sea salt, and wherein the solution has a pH not higher than about 2.1;
    draining the almonds;
    rinsing the almonds with excess water;
    combining the almonds with an aqueous solution of fulvic acid;
    processing the almonds until the almonds and pieces thereof are approximately the size of grains of rice;
    adding an aqueous acidic solution to the almond mixture;
    adding olives, dried fruit pieces and at least one of a white pepper, a black pepper, and a salt;
    processing the mixture until the solid pieces are approximately the size of sand particles;
    continue processing and adding an oil until the mixture obtains a consistency substantially similar to a traditional pate.

* * * * *